(12) United States Patent
Allen et al.

(10) Patent No.: US 11,095,695 B2
(45) Date of Patent: Aug. 17, 2021

(54) TELECONFERENCE TRANSMISSION

(71) Applicant: Hewlett-Packard Development Company, L.P., Houston, TX (US)

(72) Inventors: William J. Allen, Corvallis, OR (US); Harold Merkel, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 149 days.

(21) Appl. No.: 16/096,575

(22) PCT Filed: Jul. 26, 2016

(86) PCT No.: PCT/US2016/043992
§ 371 (c)(1),
(2) Date: Oct. 25, 2018

(87) PCT Pub. No.: WO2018/022010
PCT Pub. Date: Feb. 1, 2018

(65) Prior Publication Data
US 2020/0329081 A1    Oct. 15, 2020

(51) Int. Cl.
*H04N 7/15* (2006.01)
*H04L 29/06* (2006.01)

(52) U.S. Cl.
CPC .......... *H04L 65/403* (2013.01); *H04L 65/601* (2013.01); *H04N 7/15* (2013.01)

(58) Field of Classification Search
CPC .................................. H04L 29/06; H04N 7/15
USPC ............................................ 348/14.01–14.16
See application file for complete search history.

(56) References Cited

U.S. PATENT DOCUMENTS

| | | | |
|---|---|---|---|
| 5,854,898 A | 12/1998 | Riddle | |
| 6,525,780 B1 | 2/2003 | Bruno et al. | |
| 6,922,718 B2 | 7/2005 | Chang | |
| 9,154,737 B2 | 10/2015 | Thomas | |
| 9,602,770 B2 | 3/2017 | Hwang | |
| 2003/0149724 A1 | 8/2003 | Chang | |
| 2004/0128557 A1* | 7/2004 | Sakushima | G06F 21/6218 726/28 |
| 2004/0148197 A1* | 7/2004 | Kerr | G16H 10/60 705/2 |
| 2006/0029092 A1 | 2/2006 | Luo et al. | |
| 2011/0102539 A1 | 5/2011 | Ferren | |
| 2011/0107220 A1 | 5/2011 | Perlman | |
| 2012/0110196 A1* | 5/2012 | Balasaygun | G06Q 10/10 709/228 |

(Continued)

FOREIGN PATENT DOCUMENTS

| | | |
|---|---|---|
| CN | 101433086 B | 5/2012 |
| CN | 102265629 B | 7/2014 |

(Continued)

OTHER PUBLICATIONS

Blue Jeans Browser Access, < http://bluejeans.com/works-with/browser >.

*Primary Examiner* — Melur Ramakrishnaiah
(74) *Attorney, Agent, or Firm* — Dicke Billig & Czaja PLLC

(57) ABSTRACT

A transmission of a representation of an endpoint is disclosed. A performance of a source media is detected in a transmission of the representation of the endpoint. The detected performance of the source media is replaced with the source media in the image during transmission.

15 Claims, 3 Drawing Sheets

(56) References Cited

U.S. PATENT DOCUMENTS

| | | |
|---|---|---|
| 2013/0019186 A1 | 1/2013 | Lance et al. |
| 2015/0271446 A1* | 9/2015 | Browne .................. H04N 7/15 |
| | | 348/14.08 |
| 2015/0296180 A1 | 10/2015 | Shi et al. |
| 2016/0301727 A1* | 10/2016 | Barjonas ............... G06T 7/0002 |

FOREIGN PATENT DOCUMENTS

| | | |
|---|---|---|
| CN | 102246521 B | 9/2014 |
| CN | 103841358 B | 12/2017 |
| WO | WO-2012019163 | 9/2012 |

\* cited by examiner

TELECONFERENCE TRANSMISSION

BACKGROUND

A teleconference is a real-time or generally live communication or exchange of information among people and devices remote from one another at endpoints linked together with a telecommunications system. Examples of teleconferences include web conferences, videoconferences, web casts, and teleseminars over a telecommunications network such as a wide area network or the Internet. A teleconference can be facilitated with one or more telepresence devices that allow a person to feel as if they were present, give the appearance of being present, or to have an effect, at an endpoint other than their physical location. Examples of telepresence technologies can include microphones, webcams, and telepresence robots at an endpoint location that can transmit audio, video, data, or multimedia over the telecommunications network to a computing device at the participant's actual location. A telepresence device can include a single element, a combination of elements, or a federated collections collection of elements such as multiple webcams and microphones in a conference room. The telepresence devices can capture the surrounding environment of the participants, such as the room or other endpoint location. In some examples, a participant communicating via a telepresence robot may change perspectives at the endpoint or change endpoints. Accordingly, a teleconference simulates a face-to-face communication between physically remote participants.

DETAILED DESCRIPTION

Figure 1:
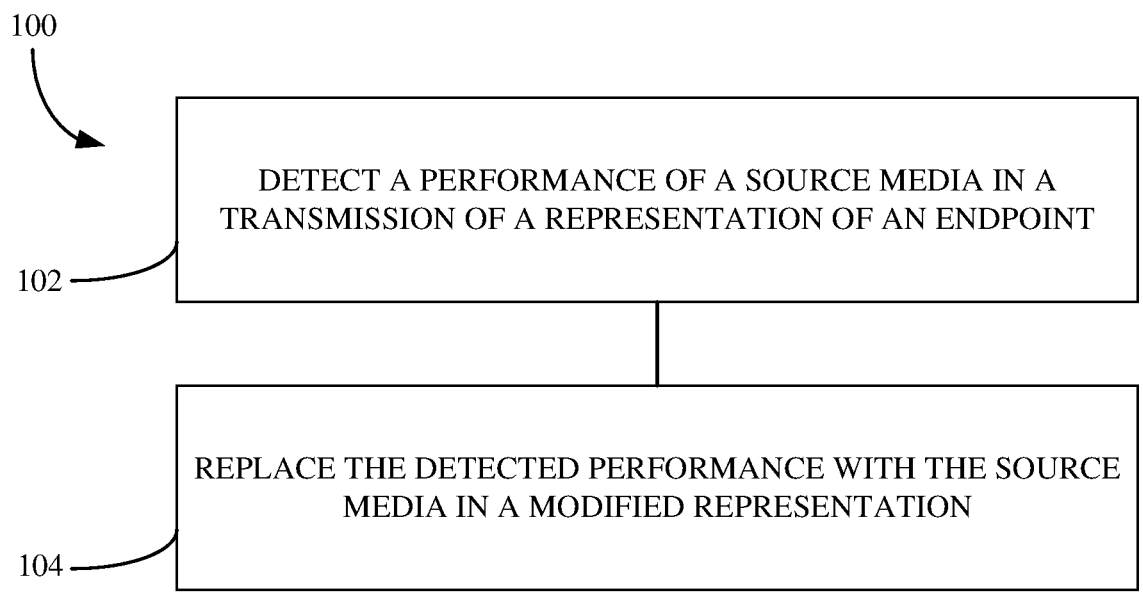
FIG. 1 is a block diagram illustrating an example teleconference transmission process.

In the following detailed description, reference is made to the accompanying drawings, which form a part hereof, and in which are shown by way of illustration as specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Participants in a teleconference may make reference to a media performing at an endpoint location to other teleconference participants at remote locations. For example, a participant may wish to share a computer slideshow presentation or a video displayed on a laptop or audio played on speakers at an endpoint location with others at the remote locations. Unfortunately, this approach to sharing media is at times less than optimal. For example, a wide-angle webcam or microphone in a telepresence device at the endpoint location may pick up and stream the performance of the media at a relatively low resolution, and the performance will be presented to the participants at the remote locations in a manner that is difficult to see or hear on their displays and speakers. Moving the telepresence device may not solve the issue of low resolution and enlarging a portion of the image that includes the performance may be less than optimal as the participant the remote location will likely then be less aware of other activities at the endpoint location. Additional environmental considerations at the endpoint location may affect the performance, such as glare or shadows on the display or noises in the conference room captured with a microphone.

One approach can provide a view a media stream of the endpoint location from the telepresence device in one application window and a view of the media in another application window on the participant's computing device display at the remote location. For example, the participant at the remote location may have an application window open to view of the video or other media stream of the participants at the endpoint location hosting the performance of the media, such as the slide show presentation, and another application window open to present the slide show presentation. While this approach can provide a reproduction of the media performance in great detail, the fidelity may come at the expense of computing overhead. Multiple windows can occupy valuable screen area, which makes difficult viewing on laptops or tablet computing devices. Often, a participant will choose to view either the conference or the media. Additionally, multiple windows can consume processing power of the computing device at the remote location if multiple applications or multiple versions of one application are used to present the video of the teleconference and the media.

FIG. 1 illustrates an example method 100 that can be applied to a transmission of a representation of an endpoint location in a teleconference. A representation of the endpoint can include an image, or series of images in a video or an audio captured with a telepresence device. A performance of a source media is detected in a transmission of the representation of the endpoint at 102. For example, the performance can include the playing or playback of a slideshow presentation on a computer display, a still image or video image in a monitor, or an audio recording being played on speakers at the endpoint location. Examples of the source media can include the digital file of the slideshow presentation program and the source video being played on the monitor or through the speakers. The detected performance of the source media is replaced with the with the source media in the image during transmission at 104. In one example, the low resolution image of the slideshow presentation captured with the telepresence device, such as a wide-angle webcam, is replaced with a relatively higher resolution source media in the representation of the endpoint location.

Figure 2:
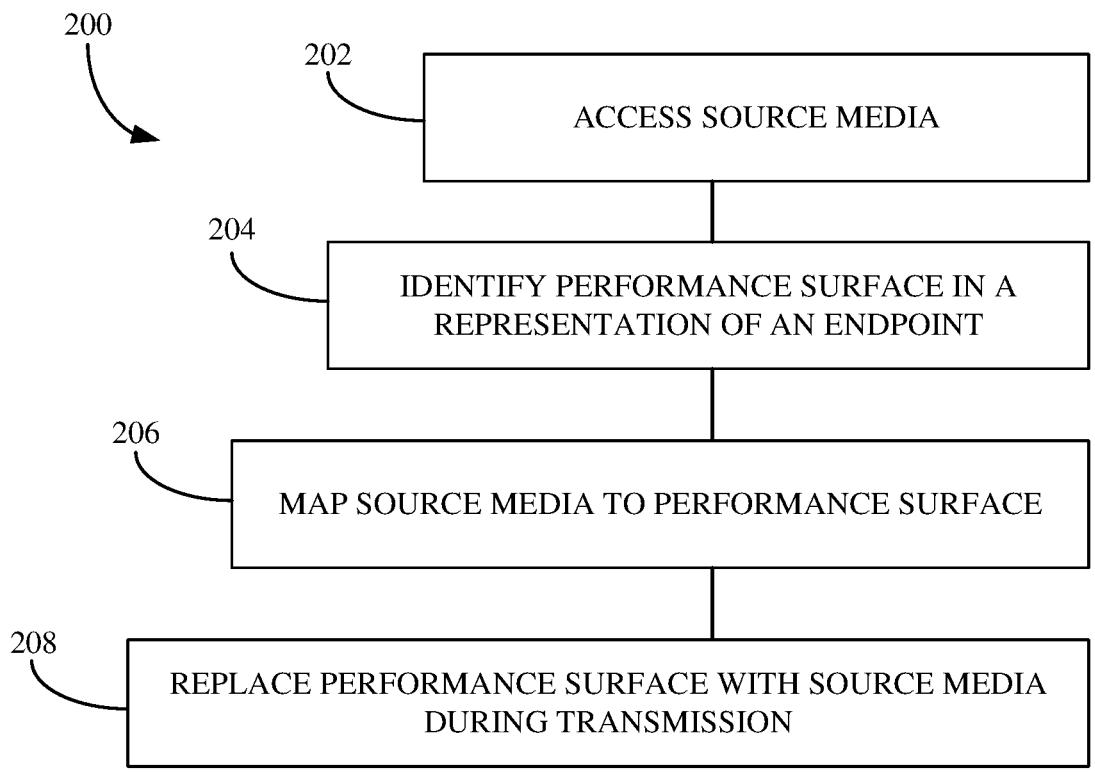
FIG. 2 is a block diagram illustrating another example teleconference transmission process.

FIG. 2 illustrates another example method 200 that can be applied to a transmission of a representation of an endpoint location in a teleconference. A source media is accessed at 202. A performance surface in the representation of the endpoint is identified at 204. For example, a portion of the video image corresponding with a computer monitor displaying a slide show presentation or video is identified. In another example, the portion of the stream corresponding with the video, audio, other media, or combinations of media is a performance surface. The source media is mapped to the performance surface at 206. During the transmission of the representation of the endpoint, the performance surface is replaced with the source media at 208.

The example methods 100, 200 can be implemented to include a combination of one or more hardware devices and programs to control a system, such as a computing device having a processor and memory, to perform methods 100, 200. For example, methods 100, 200 can be implemented as a set of executable instructions on a non-transitory computer readable medium to control the processor to perform methods 100, 200. Other methods of the disclosure can be implemented as a combination of hardware and programming for controlling a system as well.

The representation of the endpoint can include any suitable representation captured and transmitted with the telepresence device. For example, the representation of the endpoint can include a video from a webcam or telepresence robot. Also, the representation of the endpoint can include an audio transmission from a microphone. The source media can include a digital file of a slideshow presentation, video, photograph, audio in a suitable format or a photograph, audio recording, or other media. The performance of the source media can include displaying the source media in a monitor, running the source media in a corresponding application, or playing an audio through speakers at the endpoint location. The disclosure includes examples described in terms of transmitting video images from a webcam and audio from a microphone via telepresence devices at the endpoint location, such as a conference room. The disclosure also includes examples of digital videos from digital files displayed on computer monitors in the view of the telepresence devices in the conference room. These examples are for illustration, and are not intended to limit the scope of representations of the endpoint, source media, or performances of the source media.

Figure 3:
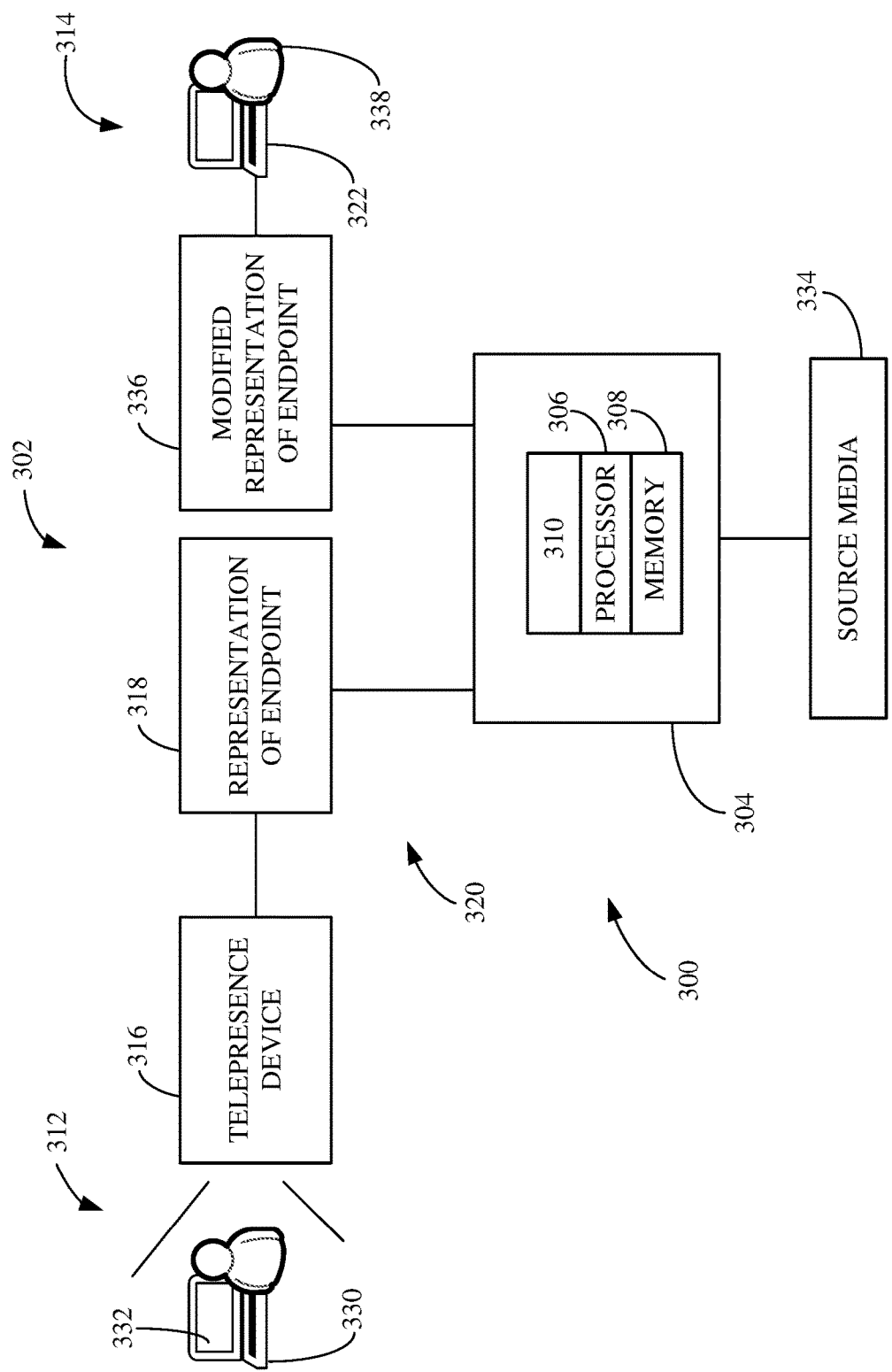
FIG. 3 is a block diagram illustrating an example system that can implement the example teleconference transmission processes of FIGS. 1 and 2.

FIG. 3 illustrates an example system 300 that can implement example methods 100, 200 in environment 302. Example system 300 includes a computing device 304 having a processor 306 and memory 308 that are configured to implement an example method of this disclosure, such as methods 100, 200, or other methods, as a set of computer readable instructions stored in memory 308 for controlling the processor 306 for performing the method. In one example, the set of computer readable instructions can be implemented a computer program 310 that can include as various combinations hardware and computer programming on a non-transitory computer or processor readable medium to operate on the system 300. Computer program 310 can be stored in memory 308 and executable by the processor 306 to transmit a teleconference.

In some examples, the computing device 304 can also have one or more additional processing or specialized processors (not shown), such as a graphics processor for general-purpose computing on graphics processor units, to perform processing functions offloaded from the processor 306. Memory 308 may be arranged in a hierarchy and may include one or more levels of cache. Memory 308 may be volatile (such as random access memory (RAM)), non-volatile (such as read only memory (ROM), flash memory, etc.), or some combination of the two. The computing device 304 can take one or more of several forms. Such forms include a tablet, a personal computer, a workstation, a server, a handheld device, a consumer electronic device (such as a video game console or a digital video recorder), or other, and can be a stand-alone device or configured as part of a computer network, computer cluster, cloud services infrastructure, or other.

Environment 302 includes an endpoint location 312 in a teleconference with other one or more other endpoints, such as location remote from endpoint 312, referred to as remote location 314. Endpoint location 312 can include a telepresence device 316, such as a webcam, microphone, and telepresence robot, to capture a representation of the endpoint 318, which is provided to system 300. The representation of the endpoint 318 can be transmitted over a telecommunications network 320 to a computing device 322 at the remote location 314. System can be incorporated as part of computing device at the endpoint location 312, a computing device at the remote location 314, or in an intermediary device operably coupled to the telecommunications network 320.

Computing device 304 often includes one or more communication connections that allow computing device 304 to communicate with other computers/applications such as with the telepresence device and computing device 322 at remote location 314. Example communication connections can include, but are not limited to, an Ethernet interface, a wireless interface, a bus interface, a storage area network interface, and a proprietary interface. The communication connections can be used to couple the computing device 304 to telecommunications network 320, which can include a collection of computing devices and possibly other devices interconnected by communications channels that facilitate communications and allows sharing of resources and information among interconnected devices. Examples of telecommunications networks 320 include a local area network, a wide area network, the Internet, or other network.

In one example, the endpoint 312 can include a computing device such as a laptop 330 in a conference room being captured by a telepresence device 316 such as a webcam in the example. Thus, the representation of the endpoint 318 can include a video of the conference room in a transmission of the teleconference. The laptop 330 can include a performance of a source media in the display and speakers of the laptop, such as a slideshow presentation or video 332 running on a slideshow application, video player, or browser on the laptop 330. The laptop 330 is in the view of the webcam 316. In other examples, the telepresence device 316 is viewing a projected image or receiving an audio of the source media driven by the laptop 330

System 300 is configured to receive the representation of an endpoint 318 including a performance of a source media. Additionally, the system 300 is configured to receive the source media 334. In the example, the system 300 can identify the performance surface in the representation of the endpoint, such as the portion of the video image corresponding to the display of laptop 330. The system 300 can map the source media 334 to the performance surface, and replace the performance surface with the source media 334 during transmission of the image, such as real-time during the teleconference transmission. System 300 can present a modified representation of the endpoint location including source media 336 to a participant 338 on computing device 322 at remote location 314. In some examples, one or more features of system 300, including processor 306 and memory 308, can be incorporated into computing device 330 or computing device 322.

Figure 4:
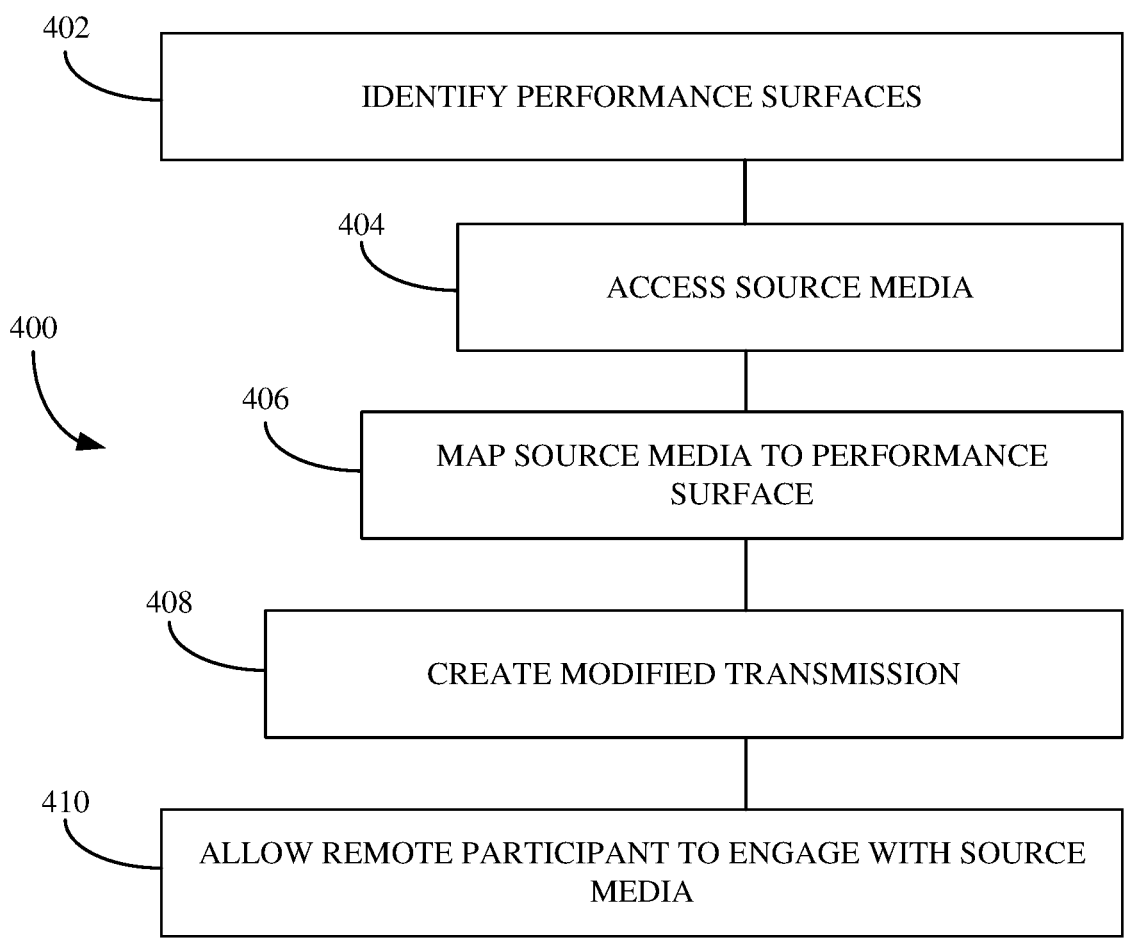
FIG. 4 is a block diagram illustrating another example teleconference process that can be implemented with example system of FIG. 3.

FIG. 4 illustrates an example method 400 of transmitting a teleconference that can include the features of example methods 100, 200 performed with example system 300. The performance surface or performance surfaces in the representation, such as performance surfaces, of the endpoint are identified at 402. Source media for the performance surface or surfaces is accessed at 404. The source media is mapped to the performance surface at 406. The performance surfaces are replaced with the source media during the transmission of the representation of the endpoint to create a modified transmission for remote participants at 408. In some examples, the remote participants are able to selectively engage with the source media at 410. The example method 400 can be implemented to include a combination of one or more hardware devices and programs to control a system, such as system 300, to perform method 400.

In one example, the identification of performance surface or surfaces in the representation of the endpoint at 402 can include discovery of the performance surfaces on the representation and calibration of the discovered surfaces. Detecting the performance surfaces in a video image can include energizing the performance devices, such as displays and monitors, with a video signal that can be identified by the system 300. For example, the displays and monitors in the view of the telepresence device can be provided with signal to cause the displays and monitors to output an image, such as flashing red and green rectangles, that the system can identify as an performance surface. Additionally, or alternatively, the system can detect performance surfaces using visual cues or artifacts common in displays or monitors, such as dynamic images or aliasing that are created when a displayed image is scanned by a sensor with low refresh rates. In one example, detecting continues to identify additional performance surfaces in the representation of the endpoint. In one example, the system can be set to continuously or periodically detect performance surfaces in case the telepresence device or the display is moved with respect to the other. If the telepresence device can be moved by the remote participant, such as the case with a telepresence robot, the system can automatically re-discover performance surfaces.

The location of each performance surface in the representation of the endpoint can be recorded, such as recording the location in a video pixel space in memory. The system can also transform the coordinates of the video pixel space to other workspaces. The detected performance surfaces can be provided with identifying information also to be recorded in memory. Identifying information can include video stream identifier data and metadata. Additionally, the identifying information can include privilege data that indicates, for example, a level of security or access to be given the output in the display corresponding with the performance surface. In this example teleconference participants in the remote locations can only view the source media in the displays if they have a corresponding security or access level, and others without security or access privileges will simply see a blank or otherwise occluded display screen.

Source media for the performance surface or surfaces is accessed at 404. In one example, the source media may be identified by a teleconference participant and placed in folder that is accessible by the system. In another example, a teleconference participant may identify the source media using identifier data, such as a universal resource identifier, and the system is able to access to the source media from a network. Additionally, coordinates of the source media can be determined and stored in memory. In one example, coordinates of the source media can be represented in units of pixels.

In one example, the system can analyze the performance surface to search for the source media. This analysis of the performance surface can be performed as part of identifying the performance surfaces at 402. Performance surfaces can be analyzed against likely (or unlikely) source media for matches of the media in the performance of the source media and the source media. For example, In the case of a recurring meeting or an ongoing project, there may be a set of source media frequently accessed in the case of a reoccurring meeting or ongoing project subject to the teleconference. Similarly, each participant in the teleconference may have a set of source media they access with some frequency.

In some examples, the performance surface may include a static image, such as a photograph or single slide as the performance of the source media. In other examples, the source media may change with time during the performance of the source media, such as in the performance of the video or a slideshow presentation. Dynamic analysis can detect the position of the source media with respect to the performance of the source media. For example, if the slides change throughout a slideshow presentation in a monitor at the endpoint location, dynamic analysis of the performance surface of the video of the endpoint location can adjust the slides in the source media to correspond with the slides on the monitor at the endpoint location. Source media can be provided with metadata to assist in corresponding the location of the position of the source media, such as the slides in the slideshow presentation or the timing in a video presentation. Audio source content associated with each identified performance surface may optionally be cataloged and accessed.

Spatial transforms can be applied to map the source media to the performance surface. In many circumstances, the viewable source media fits a rectangle and the displays and monitors at the endpoint location are rectangles. Representations of the displays and monitors performing the source media, however, can be distorted. The performance surfaces can appear as trapezoids or the performance of source media can be rotated or flipped via telepresence devices. Geometric transformations for texture mapping can be applied to map coordinates of the source media with coordinates of the performance surfaces. For example, the source media can be transformed to fit the corresponding performance surface with pixel mapping.

Audio source media can undergo an appropriate processing such as leveling, placement in a stereo signal pair, or other processing for mixing in for independent consumption by a remote participant.

The performance surfaces are replaced with the source media during the transmission of the representation of the endpoint to provide a modified transmission at 408. For example, the visual aspect of the source media is inserted real-time into the performance surfaces of the video image captured with the telepresence device to produce a modified video stream of the endpoint for participants at remote locations.

System 300 can include a combination of one or both video switching hardware and video switching programming capable of generally real-time alpha-channel insertion. A warped image of the source media can be created according to the mapping at 406 and applied in conjunction with a corresponding created alpha-channel to direct video hardware and programming to perform the insertion of the source media. An insertion via alpha-channel can be performed for each source media in the image in the case of multiple performance surfaces.

In the case of audio aspect of the source media, relevant audio from captured via the telepresence device is processed and removed, such as synthetically stripped from the captured audio stream. The audio aspect of the source media can be mixed into the remaining audio captured with the telepresence device to be produce a modified audio stream provided to the remote participants.

The performance surfaces of the video image can be replaced with blocking images for remote participants without permission to view the source media as determined, for instance, by comparing the access privilege data of the source media with the access privileges of the participant. Instead of replacing the performance surfaces with the source media, the performance surfaces are replaced with black images or other permitted content. In one example, the blocking image could be a simulated image of the display or monitor in an off configuration or a non-operating mode. Also, audio from the representation of the endpoint can be selectively delivered or removed from the modified transmission in response to access privileges. For example, source video or audio having an access privileges of 1 can replace the performance surfaces in the modified transmission to all participants having access privileges of 1 and blocking video is inserted and corresponding audio removed in the modified transmission to all participants having access privileges of 0 or not 1.

In addition to replacing the performance surfaces with the source media at 408, the system can provide additional, context-based modifications to the transmission. For example, audio in the source media can be replaced with audio translated into the language of the remote participant. In one example, source media can include a number of context-based codes, such as language, format, or other codes that identify one or more versions of the source media. The context-based codes can be matched to the preferences of the remote participants. For example, the audio and video aspect of a source media slideshow presentation may be in several languages. A subset of the performance surfaces and audio can be replaced with appropriate aspects or versions of the source media in the modified transmissions to participants that select alternative versions of the performance. Other alternative versions of the source media, such as a version appropriate for children and another version appropriate for adults, are contemplated.

In some examples, the remote participants are able to selectively engage or interact with the source media at 410. For example, the remote participant can selectively engage with the modified transmission to zoom into the source media video, or block background noises from interfering with the source media audio. Additionally, the remote participant may interact with the source media via moving a pointing device cursor on the source video in the modified stream. The position of the pointing device cursor on the source media can be detected via reverse mapping and transformation. The placement of the cursor at the remote location can be translated into positioning a cursor on the performance of the source media at the endpoint location. Still further, in some example, the source media can be selected to appear in a separate window of the computing display in the remote location. This window can allow for editing or other modifications to the source media.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method of transmitting a teleconference, comprising:
    detecting a performance of a source media in a transmission of a representation of an endpoint, the source media of a digital file and the performance on a device in the endpoint, the performance of the source media in a performance surface of the representation of the endpoint; and
    replacing the detected performance of the source media with the source media from the digital file in a modified representation of the endpoint during transmission including fitting the source media to the performance surface.

2. The method of claim 1 wherein detecting the performance includes identifying the performance surface in the transmission of the representation of the endpoint.

3. The method of claim 2 wherein identifying the performance surface includes discovering the performance surface and calibrating the discovered performance surface.

4. The method of claim 1 wherein the representation of the endpoint includes a video of the endpoint.

5. The method of claim 1 wherein replacing the detected performance includes mapping the source media to the performance surface and inserting the source media to the performance surface during transmission.

6. The method of claim 1 including adding context information in the modified representation of the endpoint during transmission.

7. A system to transmit a teleconference, comprising:
    memory to store a set of instructions, receive a source media from a digital file, and receive a transmission of a representation of an endpoint including a performance at the endpoint of the source media from the digital file; and
    a processor to execute the set of instructions to:
    identify a performance surface in the transmission of the representation of the endpoint the performance surface including the performance at the end point of the source media from the digital file;
    map the source media to the performance surface to fit the source media to the performance surface; and
    replace the performance surface with the source media during the transmission of the image of the endpoint.

8. The system of claim 7 wherein the processor executes instructions to provide the performance surface with identifying data.

9. The system of claim 7 wherein the processor executes instructions to perform a spatial transform to map the source media to the performance surface.

10. The system of claim 7 wherein the representation of the endpoint is received from a telepresence device.

11. The system of claim 10 wherein the telepresence device includes a webcam.

12. A non-transitory computer readable medium to store computer executable instructions to control a processor to:
    access a source media from a digital file;
    identify a performance surface in a transmission of a representation of an endpoint, the performance surface applying a performance of the source media from the digital file at the endpoint;
    map the source media to the performance surface to fit the source media to the performance surface; and
    replace, during the transmission of the representation of the endpoint, the performance surface with the source media.

13. The non-transitory computer readable medium of claim 12 wherein identify the performance surface includes identify a plurality of performance surfaces and to selectively replace a subset of the plurality of performance surfaces with blocking images.

14. The non-transitory computer readable medium of claim 12 wherein the representation of the endpoint includes audio and video.

15. The non-transitory computer readable medium of claim 12 including compare access privilege data of the source media with privilege data of remote participants.

* * * * *